United States Patent
Kohlstrung et al.

(10) Patent No.: US 10,301,463 B2
(45) Date of Patent: *May 28, 2019

(54) THERMALLY HARDENABLE PREPARATIONS

(71) Applicant: Henkel AG & Co. KGaA, Duesseldorf (DE)

(72) Inventors: Rainer Kohlstrung, Plankstadt (DE); Manfred Rein, Hirschberg (DE); Karl Wesch, Waldbrunn (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 764 days.

This patent is subject to a terminal disclaimer.

(21) Appl. No.: 14/160,817

(22) Filed: Jan. 22, 2014

(65) Prior Publication Data

US 2014/0131910 A1    May 15, 2014

Related U.S. Application Data

(63) Continuation of application No. PCT/EP2012/064756, filed on Jul. 27, 2012.

(30) Foreign Application Priority Data

Aug. 1, 2011  (DE) .................. 10 2011 080 223

(51) Int. Cl.
 C08L 31/04    (2006.01)
 C08J 9/00     (2006.01)
 C08J 9/10     (2006.01)

(52) U.S. Cl.
 CPC ............ C08L 31/04 (2013.01); C08J 9/0023 (2013.01); C08J 9/103 (2013.01); C08J 9/105 (2013.01); C08J 9/0095 (2013.01); C08J 2201/026 (2013.01); C08J 2203/04 (2013.01); C08J 2203/18 (2013.01); C08J 2323/08 (2013.01); C08J 2353/02 (2013.01)

(58) Field of Classification Search
 None
 See application file for complete search history.

(56) References Cited

U.S. PATENT DOCUMENTS

| | | | |
|---|---|---|---|
| 3,965,054 A | | 6/1976 | Nojiri et al. |
| 5,932,691 A | * | 8/1999 | Khanin ................... B29B 7/847 264/102 |
| 9,637,067 B2 | * | 5/2017 | Kohlstrung ............. B29C 44/18 |
| 2002/0120024 A1 | | 8/2002 | Koffler et al. |
| 2008/0265516 A1 | | 10/2008 | Walker et al. |
| 2009/0239962 A1 | * | 9/2009 | Dobashi ................. C08J 9/0061 521/95 |

FOREIGN PATENT DOCUMENTS

| | | |
|---|---|---|
| CN | 101065425 A | 10/2007 |
| CN | 102197070 A | 9/2011 |
| CN | 102197071 A | 9/2011 |
| DE | 19632351 | 2/1998 |
| DE | 102011080223 A1 | 2/2013 |
| EP | 1557453 | 7/2005 |
| GB | 1465844 | 3/1977 |
| JP | 6038443 A | 2/1985 |
| WO | 0102473 A1 | 1/2001 |
| WO | 0183206 A1 | 11/2001 |
| WO | 2005002950 A2 | 1/2005 |
| WO | 2008034755 | 3/2008 |
| WO | 200130906 | 5/2010 |

OTHER PUBLICATIONS

International Search Report issued in connection with International Patent Application No. PCT/EP2012/064756 dated Oct. 17, 2012.
ASTM D1238.
International Search Report issued in connection with International Patent Application No. PCT/EP2013/073537 dated Jul. 7, 2014. All references listed in the International Search Report are listed herein, unless cited previously.
ExxonMobil Product Datasheet—Escorene Ultra UL 7760 dated Mar. 1, 2010, 2 pages. Cited in EP Opposition for EP application 12741319.3.
Vanderbilt Chemicals, LLC—Product Specification for Varox DCP-40KE dated Aug. 19, 2009, 1 page. Cited in EP Opposition for EP application 12741319.3.

* cited by examiner

Primary Examiner — Jacob T Minskey
(74) Attorney, Agent, or Firm — Mary K. Cameron

(57) ABSTRACT

The subject matter of the present application is thermally-expandable preparations, containing (a) at least one peroxide-crosslinkable polymer, (b) at least one low-molecular, multifunctional acrylate, (c) at least one peroxide and (d) at least two different chemical propellants, the mass ratio of the at least one peroxide to the at least one low-molecular, multifunctional acrylate being at least 1:3.

8 Claims, No Drawings

THERMALLY HARDENABLE PREPARATIONS

The present application relates to a thermally expansible preparation that comprises a low molecular weight multifunctional acrylate and at least one peroxide in a specific weight ratio, pillar fillers that comprise this preparation for sealing cavities, a method for producing such kinds of pillar fillers as well as a method that uses such kinds of pillar fillers for sealing up cavities in structural components.

Modern automobiles and automobile parts have a plurality of cavities that have to be sealed in order to prevent the ingress of moisture and contaminants, as this can lead to corrosion of the body panels from within. This particularly applies to modern self-supporting body panel constructions, in which a heavy frame structure is replaced by lightweight, structurally stable frame scaffolds made of prefabricated cavity profiles. These types of construction systemically possess a series of cavities that have to be sealed against the ingress of moisture and contaminants. These types of seals additionally serve to avoid the transmission of airborne sound in such cavities and thereby reduce unpleasant automobile running noises and wind noise and consequently increase driving comfort in the automobile.

These kinds of framework and body panel parts that contain cavities can be prefabricated, for example from half-panel components that are fitted together at a later time by welding and/or adhesion to form the hollow section. In such constructional methods the cavity is therefore easily accessible in the early state of construction of an automobile body, such that sealing and sound insulating pillar fillers can be fixed in this phase of the body shell by mechanical connections, by plugging into appropriate retaining devices, bores or by welding. Furthermore, such hollow sections made of steel, aluminum or plastic materials can be manufactured in the extrusion process, by hydroforming, die casting methods or by drawing methods. The resulting cavities are then only accessible through the cross sectional openings at the end of these sections.

Pillar fillers that seal and/or have an acoustic effect in these types of cavities are often also referred to as pillar fillers, baffles or acoustic baffles. They generally consist either completely of thermally expansible molded articles or of molded articles that comprise a carrier and expansible polymeric preparations in the peripheral area. These pillar fillers are fixed in the body shell by hanging, clipping, screwing or welding onto the exposed structural elements. After the structural elements have been enclosed in the body shell and after the other pre-treatments of the body work, the process heat from the curing oven for the cathodic dip coating is then exploited in order to trigger the expansion of the expansible part of the pillar filler and thereby seal the cross section of the cavity.

In this regard, both the design and the geometry of these pillar fillers, as well as the composition of the thermally expansible preparations, are parameters that have recently been the object of continual optimization.

Thus for example, foamable compounds that comprise a mixture of a copolymer and at least one blowing agent are described in DE-A1-196 32 351.

WO-A1-2001/30906 also concerns the optimization of thermally expansible compounds and proposes that the compounds, prior to expansion, comprise at least one modified polyethylene, at least one hydrazide blowing agent, at least one hydrocarbon resin and at least one sulfur-containing curing agent.

In WO-A1-2008/034755 it is further proposed to manufacture these kinds of thermally curable compounds from at least one anhydride-functionalized thermoplastic, an amino-functionalized latent curing agent and at least one latent blowing agent.

The requirements for the thermally expansible preparations, both in the unexpanded as well as the expanded state, have become constantly more stringent in recent times.

Thus for example, it is of interest that the thermally expansible preparation in the expanded state exhibit good adhesion even on oiled sheet metal.

There is also the problem that not all parts of the automobile are heated to the same temperature in the curing oven. Thus, some regions can come closer to the heat source during curing and are therefore subjected to higher temperatures (over-cure).

In contrast, due to structural reasons, other regions may be shielded from the heat and do not attain the optimum curing temperature (under-cure). Consequently, particularly the regions in the structural cavities are often shielded by thick metal walls and due to the mass surrounding them they are not heated to the optimum temperatures, i.e. these regions then only reach maximum temperatures for a short time which are then also mostly significantly below the optimal conditions. Accordingly, it is advantageous to make the thermally expansible preparations in such a way that they undergo adequate expansion over a broad temperature range and in particular do not collapse again at higher temperatures.

Finally, the thermally expansible preparations should be formulated such that they can also fill out narrow cavities as completely as possible, thereby enabling complex cavity structures to also be optimally sealed.

The compositions of the prior art have not been able up to now to fully meet all requirements for these types of pillar fillers.

It has now been found that compositions that comprise a combination of a peroxide-crosslinkable polymer with a multifunctional acrylate and a peroxide in a specific weight ratio with the simultaneous presence of a mixture of blowing agents meet to a high degree the requirements stipulated for these types of thermally expandable preparations.

Accordingly, a first subject matter of the present invention is thermally expandable preparations, comprising
(a) at least one peroxide-crosslinkable polymer,
(b) at least one low molecular weight multifunctional acrylate,
(c) at least one peroxide as well as
(d) at least two blowing agents that differ from one another, wherein the mass ratio of the at least one peroxide to the at least one low molecular weight multifunctional acrylate is at least 1:3.

A first component that is essential for the invention is the peroxide-crosslinkable polymer. In principle, all thermoplastic polymers and thermoplastic elastomers which can be crosslinked with peroxide may be considered. The person skilled in the art designates "peroxide-crosslinkable" those polymers, in which a radical initiator can abstract a hydrogen atom from the main or side chain, such that a radical remains which attacks other polymer chains in a second reaction step.

In a first preferred embodiment, the at least one peroxide-crosslinkable polymer is selected from styrene-butadiene block copolymers, styrene-isoprene block copolymers, ethylene-vinyl acetate copolymers, functionalized ethylene-vinyl acetate copolymers, functionalized ethylene-butyl acrylate copolymers, ethylene-methyl acrylate copolymers, ethylene-ethyl acrylate copolymers, ethylene-butyl acrylate copolymers, ethylene-(meth)acrylic acid copolymers ethylene-2-ethylhexyl acrylate copolymers, ethylene-acrylic acid ester copolymers and polyolefins, such as for example polyethylene or polypropylene.

According to the invention, a functionalized copolymer is understood to mean a copolymer that is furnished with additional hydroxy groups, carboxy groups, anhydride groups, acrylate groups and/or glycidyl methacrylate groups.

In the context of the present invention, ethylene-vinyl acetate copolymers, functionalized ethylene-vinyl acetate copolymers, functionalized ethylene-butyl acrylate copolymers, ethylene-propylene-diene copolymers, styrene-butadiene block copolymers, styrene-isoprene block copolymers, ethylene-methyl acrylate copolymers, ethylene-ethyl acrylate copolymers, ethylene-butyl acrylate copolymers and ethylene-(meth)acrylic acid copolymers are particularly advantageous.

Particularly good adhesion characteristics, in particular on oily sheet metal, can be achieved if inventive thermally curable preparations are employed, which comprise one or more ethylene-vinyl acetate copolymers as the sole peroxide-crosslinkable polymer, i.e. that the thermally curable preparations are essentially free from additional peroxide-crosslinkable polymers, apart from the ethylene-vinyl acetate copolymers.

Thermally expansible preparations are inventively "essentially free of additional peroxide-crosslinkable polymers" if they comprise less than 3 wt %, preferably less than 1.5 wt %, quire particularly preferably less than 0.5 wt % of a peroxide-crosslinkable polymer that is not ethylene-vinyl acetate copolymer.

Thermally expansible preparations that comprise at least one ethylene-vinyl acetate copolymer with a vinyl acetate content of 9 to 30 wt %, in particular 15 to 20 wt %, quite particularly 17.5 to 19 wt %, based on the total mass of the copolymer, are inventively particularly preferred.

Furthermore, it has proven advantageous if the thermally expansible preparation comprises a peroxide-crosslinkable polymer, in particular an ethylene-vinyl acetate copolymer, with a melt flow index of 0.3 g to 400 g/10 min, especially 0.5 g to 45 g/10 min. Peroxide-crosslinkable polymers, in particular ethylene-vinyl acetate copolymers, with a melt flow index of 1.5 g to 25 g/10 min, especially 2 g to 10 g/10 min, quite particularly 2 g to 5 g/10 min are advantageous. It may be inventively advantageous if two or more polymers with different melt flow indices are employed in the thermally expansible preparations.

The melt flow index is inventively determined in a capillary rheometer, wherein the polymer is melted at 190° C. in a heatable cylinder and is pressed through a defined die (capillary) under a pressure resulting from the applied weight (2.16 kg) (ASTM D1238). The exiting mass is determined as a function of time.

The thermally expansible preparations inventively comprise preferably at least 45 wt % of at least one peroxide-crosslinkable polymer. Thermally expansible preparations that comprise 47 to 93.5 wt %, in particular 66 to 86 wt %, of at least one peroxide-crosslinkable polymer, each based on the total mass of the thermally expansible preparation, are particularly preferred.

The thermally expansible preparations comprise at least one low molecular weight multifunctional acrylate as the second component that is essential for the invention.

A "low molecular weight multifunctional acrylate" is inventively understood to mean a compound that possesses at least two acrylate groups and has a mole weight below 2400 g/mole, preferably below 800 g/mole.

In particular, those compounds that possess two, three or more acrylate groups per molecule, have proven inventively advantageous.

Preferred difunctional acrylates are ethylene glycol dimethacrylate, diethylene glycol dimethacrylate, triethylene glycol dimethacrylate, triethylene glycol diacrylate, tripropylene glycol dimethacrylate, 1,4-butane diol dimethacrylate, 1,3-butylene glycol dimethacrylate, 1,3-butane diol dimethacrylate, tricyclodecane dimethanol dimethacrylate, 1,10-dodecane diol dimethacrylate, 1,6-hexane diol dimethacrylate, 2-methyl-1,8-octane diol dimethacrylate, 1,9-nonane diol dimethacrylate, neopentylglycol dimethacrylate and polybutylene glycol dimethacrylate.

Preferred low molecular weight acrylates with three or more acrylate groups are glycerine triacrylate, dipentaerythritol hexaacrylate, pentaerythritol triacrylate (TMM), tetramethylolmethane tetraacrylate (TMMT), pentaerythritol trimethacrylate, di(trimethylolpropane)tetraacrylate (TMPA), pentaerythritol tetraacrylate, trimethylolpropane triacrylate (TMPTA), tri(2-acryloxyethyl)isocyanurate and tri(2-methacryloxyethyl)trimellitate as well as their ethoxylated and propoxylated derivatives with a maximum content of 35 EO units and/or 20 PO units.

Thermally expansible preparations that comprise a low molecular weight multifunctional acrylate selected from triethylene glycol diacrylate, triethylene glycol dimethacrylate, trimethylolpropane triacrylate (TMPTA) and trimethylolpropane trimethacrylate (TMPTMA), pentaerythritol triacrylate (TMM), tetramethylolmethane tetraacrylate (TMMT), pentaerythritol trimethacrylate, di(trimethylolpropane)tetraacrylate (TMPA) and pentaerythritol tetraacrylate are inventively quite particularly preferred.

In addition to the low molecular weight acrylates according to the invention, the thermally expansible preparations according to the invention can comprise additional co-crosslinkers, such as for example allyl compounds, such as triallyl cyanurate, triallyl isocyanurate, triallyl trimesate, triallyl trimellitate (TATM), tetraallyl pyromellitate, the diallyl ester of 1,1,3-trimethyl-5-carboxy-3-(4-carboxyphenyl) indene, trimethylolpropane trimellitate (TMPTM) or phenylene dimaleimide.

It has proven inventively particularly advantageous if the thermally expansible preparations comprise at least one low molecular weight multifunctional acrylate selected from triethylene glycol diacrylate, trimethylolpropane triacrylate (TMPTA) and trimethylolpropane trimethacrylate (TMPTMA).

The low molecular weight multifunctional acrylates are comprised in the thermally expansible preparations preferably in an amount of 0.2 to 2.5 wt %, particularly 0.4 to 1.4 wt %, each based on the total mass of the thermally expansible preparation.

The thermally expansible preparations according to the invention comprise at least one peroxide as the third inventively essential component. The organic peroxides, such as for example ketone peroxides, diacyl peroxides, peresters, perketals and hydroperoxides are particularly inventively preferred. Cumene hydroperoxide, t-butyl peroxide, bis(tert-butylperoxy)-diisopropylbenzene, di(tert-butylperoxyisopropyl)benzene, dicumyl peroxide, t-butyl peroxybenzoate, dialkyl peroxydicarbonate, diperoxy ketals (e.g. 1,1-di-tert-butylperoxy-3,3,5-trimethylcyclohexane), ketone peroxides (e.g. methyl ethyl ketone peroxides) and 4,4-ditert-butylperoxy-n-butyl valerate are particularly preferred, for example.

Exemplary inventively particularly preferred are the commercially available peroxides marketed by Akzo Nobel such as 3,3,5,7,7-pentamethyl-1,2,4-trioxepan, 2,5-dimethyl-2,5-di(tert-butylperoxy)hex-3-yne, di-tert-butyl peroxide, 2,5-dimethyl-2,5-di(tert-butylperoxy)hexane, tert-butyl cumyl peroxide, di(tert-butylperoxyisopropyl)benzene, dicumyl peroxide, butyl-4,4-di(tert-butylperoxy)valerate, tert-butylperoxy-2-ethylhexyl carbonate, 1,1-di-(tert-butylperoxy)-3,3,5-trimethylcyclohexane, tert-butylperoxy benzoate, di-(4-methylbenzoyl)peroxide and dibenzoyl peroxide.

It has also proven inventively advantageous if the added peroxides are essentially inert at room temperature and are only activated by heating to higher temperatures (for example when heated to temperatures between 130° C. and 240° C.). It is inventively particularly advantageous if the half-life of the added peroxide at 65° C. is more than 60 minutes, i.e. after heating the thermally expansible preparation comprising the peroxide to 65° C. for 60 minutes less than half of the added peroxide has decomposed. Those peroxides that have a half-life of 60 minutes at 115° C. can be inventively particularly preferred.

It can be inventively particularly preferred to employ di(tert-butylperoxyisopropyl)benzene as the peroxide; this is commercially available for example under the trade names Perkadox® 14-40 B-PD or Perkadox® 14-40 K PD from Akzo Nobel or under the trade name Peroxan® BIB 40 GS or Peroxan® BIB 40 P from Pergan.

In another inventive form it can likewise be preferred to employ dicumyl peroxide, as is marketed under the trade names Perkadox® BC 40 K PD or Perkadox® BC 40 B PD from Akzo Nobel or under the trade names Peroxan® DC 40 GS, Peroxan® DC 40 P or Peroxan® DC 40 PK from Pergan.

Furthermore, it is inventively advantageous if the at least one or the peroxides are employed in a form deposited on a solid, inert carrier, such as for example calcium carbonate and/or silica and/or kaolin.

The at least one or the peroxides are preferably comprised in the thermally expansible preparations according to the invention in an amount of 0.2 to 1.1 wt %, particularly in an amount of 0.4 to 0.7 wt %, each measured as the active substance content of peroxide relative to the total mass of the thermally expansible preparation.

In addition it is essential for the invention that the mass ratio of the at least one peroxide to the at least one low molecular weight multifunctional acrylate is at least 1:3. A mass ratio of at least 1:3 is inventively always achieved if the formulation based on 1 g peroxide comprises at most 3 g of low molecular weight multifunctional acrylate. A mass ratio of at least 1:2.5, in particular at least 1:1.5, is particularly preferred.

By choosing this mass ratio it is inventively possible to improve the bonding, i.e. adhesion to the opposite sheet metal. It was found that the thermally expansible preparations according to the invention exhibit an improved adhesion, particularly in constrictions of the system to be sealed, as the foam even expands into the smallest corners and sharp angles and thereby enables a more complete sealing of the system.

The thermally expansible preparations comprise at least two different chemical blowing agents as the fourth inventively essential component.

A chemical blowing agent is inventively understood to mean compounds that decompose when heated and thereupon release gases.

Exemplary suitable chemical blowing agents are azo compounds, hydrazide compounds, nitroso compounds and carbazide compounds, such as for example azobisisobutyronitrile, azodicarbonamide (ADCA), di-nitroso-pentamethylenetetramine, 4,4'-oxybis(benzene sulfonic acid hydrazide) (OBSH), azocyclohexylnitrile, azodiaminobenzene, benzene-1,3-sulfonyl hydrazide, calcium azide, 4,4'-diphenyldisulfonyl azide, diphenyl-sulfono-3,3'-disulfo hydrazide, benzene-1,3-disulfo hydrazide, trihydrazino triazine, p-toluene sulfonyl hydrazide and p-toluene sulfonyl semicarbazide.

It can be inventively preferred if the thermally expansible preparations comprise a first blowing agent that is already activated below 140° C., and a second blowing agent that is first activated at temperatures above 160° C.

It has proven to be inventively particularly advantageous if a mixture of blowing agents of at least one sulfonic acid hydrazide and azodicarbonamide is employed.

Preferred sulfonic acid hydrazides are in particular 4,4'-oxybis(benzene sulfonic acid hydrazide) (OBSH), benzene-1,3-sulfonic acid hydrazide and 4-methylbenzene sulfonic acid hydrazide.

In the context of this embodiment, preparations have proven to be advantageous which comprise an azadicarbonamide content of 0.5 to 3.5 wt %, in particular 1.0 to 2.5 wt %, each based on the total mass of the thermally expansible preparation.

Thermally expansible preparation are further preferred which comprise a sulfonic acid hydrazide content of 5.0 to 12.5 wt %, in particular 5.2 to 8.5 wt %, each based on the total mass of the thermally expansible preparation.

The thermally expansible preparations according to the invention exhibit in particular a continuous expansion behavior over a broad temperature range without shrinking effects under conditions of over-cure, if they comprise an excess of sulfonic acid hydrazide over the azadicarbonamide. Formulations with a mass ratio of sulfonic acid hydrazide:azadicarbonamide of at least 3:1, in particular more than 3.5:1, have proven to be quite particularly preferred in this regard.

The "chemical blowing agents" according to the invention can be advantageously employed in combination with activators and/or accelerators, such as for example zinc compounds (for example zinc oxide, zinc stearate, zinc ditoluene sulfinate, zinc dibenzene sulfinate), magnesium oxide and/or (modified) ureas. The zinc compounds, in particular zinc ditoluene sulfinate, are inventively particularly preferred.

It is inventively not significant whether the blowing agents are employed already in activated form or whether the thermally expansible preparations comprise, in addition to the blowing agent, a suitable activator and/or accelerator, such as for example zinc ditoluene sulfinate.

It has proven particularly advantageous if the thermally expansible preparations according to the invention comprise the activators and/or accelerators, in particular the zinc compounds, quite particularly the zinc ditoluene sulfinate, in an amount of 0.2 to 1.4 wt %, in particular 0.5 to 0.85 wt %, based on the total mass of the thermally expansible preparation.

Besides the components according to the invention the thermally expansible compounds can comprise still further conventional components, such as for example colorants, fillers and/or antioxidants.

Exemplary fillers can concern the diverse ground or precipitated chalks, carbon black, calcium magnesium carbonates, talc, graphite, barium sulfate, silicic acids or silicas as well as in particular siliceous fillers, such as for example mica, for example in the form of chlorite, or siliceous fillers of the aluminum magnesium calcium silicate type, e.g. Wollastonite. Talc is a particularly preferred filler.

The fillers are preferably added in an amount of 1 to 16 wt %, in particular 5 to 10 wt %, each based on the total mass of the thermally expansible preparation.

Chromophoric components, in particular black colorants based on carbon black are preferably comprised in the thermally expansible preparations according to the invention in an amount of 0 to 0.6 wt %, particularly 0.2 to 0.4 wt %, each relative to the total mass of the thermally expansible preparation.

Sterically hindered phenols and/or sterically hindered thioethers and/or sterically hindered aromatic amines can be added as the antioxidants or stabilizers, such as for example bis-(3,3-bis-(4'-hydroxy-3-tert.butylphenyl)butanoic acid)glycol ester.

Antioxidants or stabilizers are preferably comprised in the thermally expansible preparations according to the invention in an amount of 0 to 0.5 wt %, particularly 0.1 to 0.3 wt %, each relative to the total mass of the thermally expansible preparation.

The thermally expansible preparations according to the invention are preferably formulated such that they are solid at 22° C. A thermally expansible preparation is inventively designated as "solid" if the geometry of this preparation is not deformed by the force of gravity at the cited temperature within 1 hour, in particular within 24 hours.

The thermally expansible preparations according to the invention can be manufactured by mixing the selected components in any suitable mixer, such as for example a dispersive mixer, a planetary mixer, a twin screw mixer, a continuous mixer or an extruder, in particular a twin screw extruder.

Although it can be advantageous to heat the components somewhat in order to facilitate the formation of a homogenous, uniform compound, care has to be taken that no temperature is attained that can activate the peroxide and/or the mixture of blowing agents. The resulting thermally expansible preparation can be directly shaped after its manufacture, for example by blow molding, pelletization, injection molding, compression molding, stamping or extrusion.

Although it can be inventively preferred to manufacture the whole thermally expansible preparation, to extrude it and for example to store it in pellet form until the production of the pillar filler, it has also proven inventively advantageous to formulate the thermally expansible preparation as a two-component composition until it is thermally molded.

These two-component compositions preferably include a first component that comprises a low content of the total amount of peroxide-crosslinkable polymer as well as all other components. This first component can be produced separately and stored. This separation of the whole preparation into two components enables a cost-optimized production of the pillar filler, as all the critical ingredients are comprised in the first formulation that weighs less than the final thermally expansible preparation. Preferably, a maximum of 20% of the total amount of the peroxide-crosslinkable polymer are comprised in the first component. The second component then comprises the remaining amount of the polymer as well as optionally additional auxiliaries and additives. It can be inventively preferred if the second comphoment comprises only the remaining amount of the polymer.

Before manufacturing the pillar filler both the components of the two-component composition can be blended together in an injection molding machine equipped with a twin screw and the resulting mixture can then be injected into the desired shape. However, it is also inventively possible to blend the ingredients of the two-component composition firstly to the complete thermally expansible preparation, to pelletize it and then in a separate step to inject the pelletized total preparation into the molds.

The expansion of the thermally expansible preparation is brought about by heating, wherein the preparation is heated for a specified time to a specified temperature that is sufficient to activate the blowing agent as well as the peroxide.

Depending on the composition of the preparation and the conditions of the production line, these temperatures are usually in the range 130° C. to 240° C., preferably 150° C. to 200° C., with a dwell time of 10 to 90 minutes, preferably 15 to 60 minutes.

In the automobile construction segment it is particularly advantageous if the expansion of the preparation according to the invention occurs during the passage of the automobile through the curing oven for the cathodic dip coating, such that a separate heating step can be avoided.

The thermally expansible preparations of the present invention can be employed in a broad range of sealing and adhesive applications, for example in the segment of pillar fillers for sealing cavities in automobiles.

The thermally expansible preparations are accordingly particularly suitable for manufacturing pillar fillers for sealing cavities, i.e. for manufacturing parts that are inserted into the cavities of automobiles, then expanded under the action of heat and in this way seal the cavity as completely as possible.

Accordingly, a second subject matter of the present invention is a pillar filler for sealing cavities of a structural component and which has a shape that matches the cavity and possesses a thermally expansible preparation according to the invention.

Such pillar fillers are usually manufactured from the thermally expansible preparations according to the invention by injection molding techniques. For this the thermally expansible preparations are heated to temperatures in the range 70 to 110° C., in particular 75 to 90° C. and then injected into a suitably shaped mold.

It is inventively preferred if the pillar fillers possess at least one fastening element that enables the pillar filler to be anchored in the cavity.

In one embodiment of this subject matter of the present invention, the pillar fillers are produced exclusively from the thermally expansible preparation. Thus the preparation can be brought into the desired shape of the pillar figure by an injection molding process, by die cutting from a prefabricated sheet or by extrusion through a matrix with subsequent trimming.

In this embodiment, fastening elements are an integral part of the pillar figure, i.e. they are also produced from the thermally expansible preparation. Such fastening elements can assume the form of a bulge and thus help the pillar filler to remain at the intended place in the cavity.

Thus the fastening elements can be shaped for example such that they can be inserted into an opening of the cavity, wherein they are preferably shaped such that they can no longer be removed from the opening (for example by using hooks or suitable ridges). Here it is particularly preferred if the fastening elements are produced from the thermally expansible preparation, as this also completely seals these openings in the course of the heat-induced expansion.

In another embodiment of this subject matter of the present invention, only the major ingredient of the pillar filler is produced from the thermally expansible preparation.

In addition to the expansible major part, the pillar fillers of this embodiment comprise fastening elements made of another non-expansible material, such as for example metal or heat-resistant plastic. Thus for example, a pin or a compressible plug can be inserted into an opening of the cavity to be sealed and anchored as a fastening element on an edge in the thermally expansible preparation.

In another preferred embodiment of this subject matter of the present invention, it has proven advantageous if the pillar filler has a carrier, onto which the thermally expansible preparation is deposited. This development enables an exceptionally cost-effective and efficient use of the thermally expansible preparation. Thus for example, the amount of the thermally expansible preparation that is required for sealing the cavity can be minimized. Moreover the carrier can be used to direct the expanding foam towards the walls of the cavity, in order to avoid any slumping or any other unwanted deformation of the foam. The amount of the thermally expansible preparation in the pillar filler is preferably chosen such that the foamed material completely fills up the gap between pillar filler and cavity walls and thus seals the cavity and prevents the transmission of noises.

The carrier preferably consists of a thermoplastic material that under normal conditions of application is sufficiently break proof and has a melting point or softening point that is above the curing temperature of the component. The carrier can be inventively produced from a great number of polymeric materials, such as for example polyesters, aromatic polyethers, polyether ketones and especially polyamides, such as for example nylon-66. In addition to the polymeric ingredients, the carrier can comprise additional additives and fillers, such as for example colorant and/or reinforcing fibers. Alternatively, the carrier can also be produced from metal, such as for example steel or aluminum.

The thermally expansible preparation together with the carrier can be produced by conventional processes. In particular, injection molding processes, in which both components are injected, are particularly advantageous. However, it is also inventively preferred if the carrier material is injected in a separate step and only then the thermally expansible preparation is deposited in a separate step onto the carrier, optionally even by means of a separate machine.

The pillar fillers according to the invention can be employed in all products that possess cavities. Besides automobiles these are for example aircraft, household appliances, furniture, buildings, walls, partitions or even boats.

A further subject matter of the present invention is a method for sealing cavities of a structural component, characterized in that a pillar filler according to the invention is inserted into the cavity and subsequently heated up to a temperature above 130° C., such that the thermally expandable preparation expands and seals the cavity.

With respect to the details of this subject matter of the present invention, the statement already made on the other subject matters applies mutatis mutandis.

A further subject matter of the present invention is the use of a pillar filler according to the invention for acoustically sealing cavities in structural components and/or for sealing cavities in structural components against water and/or moisture.

With respect to the details of this subject matter of the present invention, the statement already made on the other subject matters applies mutatis mutandis.

EXAMPLES

1 Production of the Formulations
1.1 Production of the Masterbatches

Various masterbatches were produced with colorant, talc, zinc ditoluene sulfinate, trimethylolpropane trimethacrylate, dicumyl peroxide, di(tert-butylperoxyisopropyl)benzene, EVA, LDPE, bis-(3,3-bis-(4'-hydroxy-3-tert. butylphenyl) butanoic acid glycol ester, diphenyloxide-4,4'-disulfohydrazide and azodicarbonamide in the quantities listed in Table 1. For this the components were mixed together, fed at 70-90° C. into a continuous twin screw extruder and then extruded and pelletized.

1.2 Production of the Thermally Expansible Preparations

In order to produce the thermally expansible preparations according to the invention, the various masterbatches, each with the quantities listed in Table 1 of additional ethylene-vinyl acetate copolymer, were mixed at 70 to 110° C. in a twin screw injection molding machine, injected in various shapes of plaque (20 cm×20 cm, thickness 2-6 mm) and cooled down to room temperature.

2 Determination of the Expansion

In order to determine the expansion, test specimens (40 mm×40 mm×4 mm) were cut out of prepared plaques and placed in a circulating air oven that was heated to the temperature listed in Table 1 (heat-up time ca. 7 to 10 min) and the test specimens were then left at this temperature for the length of time cited in Table 1. The expansion at 180° C. corresponds here to the ideal conditions that are obtained in the context of the curing step in automobile construction. The expansion at 150° C. simulates the conditions of under-cure, the expansion at 220° C. the conditions of over-cure.

The degree of expansion was measured by means of the water displacement method according to the Formula $$\text{Expansion} = \frac{(m2 - m1)}{m1} \times 100$$

m1=mass of the test specimen in deionized water in the original state
m2=mass of the test specimen in deionized water after curing.

3 Determination of the Adhesion on Various Types of Steel

In another test series the adhesion of the obtained expanded compositions on various types of steel was determined. Three samples of each of the following steels were used and the mean value of the results determined:
HDG: hot dipped galvanized steel
EGS: electro galvanized steel
CRS: cold rolled steel
KTL: electrocoated steel A strip (150 mm×20 mm×2 mm) from the injection molded plaque was laid in the middle of an oiled metal sheet (250 mm×100 mm×0.8 mm); oiled with Multidraw PL 61; manufacturer Zeller & Gmelin) and fixed by screwing through the metal sheet and material. At a distance of 6 mm from the base metal sheet, a second cover sheet (250 mm×30 mm×0.8 mm) was mounted by means of fixing screws directly above the material and the assembly was stored for at least one hour at 23° C. to condition it prior to curing. The test specimens were then heated in a circulating air oven for the times and temperatures shown in Table 1; the product when heated expanded and filled the gap between base and cover sheet ("sandwich" assembly). At the conclusion of the heating the test sheet was stored at 23° C. for at least 4 hours. The adhesion was tested at an angle of 180° by loosening the screws and removing the cover sheet.

4 Formulation and Measurement Results
4.1 Tabular Overview

Unless otherwise stated, the quantities are understood to be in weight percent.

TABLE 1

|  | Example | | | | | | |
| --- | --- | --- | --- | --- | --- | --- | --- |
|  | 1 | 2 | 3 | 4 | 5 | VV1 | VV2 |
| Colorant, black | 0.2 | 0.2 | 0.2 | 0.3 | 0.5 | — | 0.2 |
| Talc | 6.6 | 7.2 | 5.8 | 9.8 | 15.8 | 3.3 | 6.6 |
| Unicell ® TM | 0.6 | 0.6 | 0.6 | 0.8 | 1.4 | 0.4 | 0.6 |
| Sartomer SR 350 | 0.8 | 0.6 | 1.6 | 0.8 | 1.2 | 1.6 | 1.6 |
| Perkadox ® 14-40 B-PD | 1.6 | 1.2 | 1.6 | 1.6 | 2.6 | 1 | 0.8 |
| Elvax 460A | 7.8 | 7.8 | 7.8 | 10.6 | 17.2 | — | 7.8 |
| Icorene ® MP 650-35 | — | — | — | — | — | 5.0 | — |
| Hostanox 03 PWD | 0.2 | 0.2 | 0.2 | 0.3 | 0.4 | 0.1 | 0.2 |
| Unicell ® OH | 5.6 | 5.6 | 5.6 | 7.7 | 12.4 | 1 | 5.6 |
| Unicell ® D200A | 1.6 | 1.6 | 1.6 | 2.1 | 3.5 | 3.6 | 1.6 |
| Elvax 460A | 75 | 75 | 75 | 66 | 45 | 84 | 75 |
| SUM | 100 | 100 | 100 | 100 | 100 | 100 | 100 |
| Expansion at 15 min @ 150° C. [%] | >500 | >500 | >500 | >500 | >500 | <200 | <500 |
| Adhesion to HDG/EGS/CRS/KTL at 15 min @ 150° C. (oiled with 3 g/m2) | 100% cohesive | 100% cohesive | 100% cohesive | 100% cohesive | 100% cohesive | 0% cohesive | 80% cohesive |
| Expansion bei 10 min @ 180° C. [%] | >650 | >600 | >600 | >700 | >800 | >500 | <650 |
| Adhesion to HDG/EGS/CRS/KTL at 10 min @ 180° C. (oiled with 3 g/m2) | 100% cohesive | 100% cohesive | 100% cohesive | 100% cohesive | 100% cohesive | 80% cohesive | 100% cohesive |
| Expansion at 40 min @ 220° C. [%] | >700 | >700 | >700 | >800 | >1000 | <500 | >700 |
| Adhesion to HDG/EGS/CRS/KTL at 40 min @ 220° C. (oiled with 3 g/m2) | 100% cohesive | 100% cohesive | 100% cohesive | 100% cohesive | 100% cohesive | 80% cohesive | 100% cohesive |

4.2 Index of the Utilised Commercial Products

| | |
| --- | --- |
| Elvax ® 460A | ethylene-vinyl acetate copolymer, (ca. 18 wt % vinyl acetate content in the copolymer, melt flow index 2.5 g/10 min at 190° C. and a weight of 2.16 kg) (DuPont) |
| Hostanox ® 03 PWD | ethylene glycol-bis[3,3-bis(3-tert-butyl-4-hydroxyphenyl)-butanoate] (Clariant) |
| Icorene ® MP 650-35 | LDPE, powder, melt temperature 90-120° C., colorless, |
| Perkadox ® 14-40 B-PD | di-(tert-butylperoxyisopropyl)benzene on a calcium carbonate-silica carrier, ca. 40 wt % active substance content (Akzo Nobel) |
| Sartomer ® SR 350 | trimethylolpropane trimethacrylate (Sartomer) |
| Unicell ® D200A | azodiacarbonamide (Tramaco) |
| Unicell ® OH | diphenyloxide-4,4'-disulfohydrazide (OBSH) (active substance content more than 90%) (Fernz Speciality Chemicals) |
| Unicell ® TM | zinc di-toluene sulfinate (Tramaco) |

4.3 Expression of Results

The exact compositions of the various formulations as well as the results of the determination of the expansion behavior and the adhesion behavior under different conditions were summarized in Table 1.

4.3.1 Comparison with Comparative Test VV1

Whereas 100% of the inventive preparations 1 to 5 exhibited an advantageous cohesive fracture behavior under the test conditions, the comparative formulation VV showed a significantly higher number of adhesive fractures (up to 0% cohesive in the case of under-cure conditions). The adhesion of the comparative formulation on oiled steel is consequently significantly worse than the adhesion of the inventive formulations under the same conditions.

In addition it can be seen from the measured expansion degrees that the inventive preparations continued to expand when the curing temperature was increased. Even with strong over-cure conditions (heating to 220° C. for 40 minutes), these preparations did not slump, but continued to expand. In contrast, the comparative formulation from the prior art showed an expansion maximum when cured at 180° C. and then began to shrink in a disadvantageous manner.

4.3.2 Comparison with Comparative Test VV2 a) Expansion

In the under-cure range (expansion at a temperature of ca. 150° C.) the comparative example 2 exhibited a significantly lower expansion than the inventive formulations. This effect also still occurred for an expansion at ca. 180° C.

b) Adhesion

In the determination of the adhesion to oiled metal sheets the comparative formulation VV2 showed in the under-cure conditions only 80% cohesive fracture behavior and thus showed a significantly poorer adhesion under these conditions than the inventive formulations.

c) Filling Out Narrow Cavities

For the purposes of comparison the inventive formulation 1 and the comparative formulation VV2 were again processed into plaques (200 mm×200 mm×4 mm). Strips (80 mm×30 mm×4 mm) were cut out of each plaque and laid in 3 layers on top of one another in a (symmetrical) metal pipe with a depth of 10 cm and a trapezoidal cross section (90 mm/78 mm×45 mm). The metal pipes filled with the strips were then each cured for 10 minutes at 180° C. (object temperature).

This test showed that the comparative formulation 2 did not completely fill the cavity (only 75-80% of the volume of the cavity was filled); consequently the cavity was not sealed. In contrast, the inventive composition of example 1 completely filled up the cavity and adequately sealed up the available volume.

d) Summary

It has therefore been demonstrated that the inventive formulation 1 (mass ratio of the at least one peroxide to the at least one low molecular weight multifunctional acrylate was 0.8 (greater than 0.333)) is superior to the formulation of the comparative example 2 (mass ratio of the at least one peroxide to the at least one low molecular weight multifunctional acrylate was 0.2 (less than 0.333)) both in regard to the expansion rate as well as in regard to the fracture behavior. Also, in regard to the sealing of three-dimensional cavities, the inventive formulation surprisingly proved to be significantly superior.

What is claimed is:

1. A thermally expandable preparation, comprising
   (a) at least one peroxide-crosslinkable polymer,
   (b) at least one low molecular weight multifunctional acrylate,
   (c) at least one peroxide, and
   (d) at least two chemical blowing agents,
   wherein the thermally expandable preparation has a mass ratio of the at least one peroxide to the at least one low molecular weight multifunctional acrylate that is at least 1:3;
   (d) comprises at least one sulfonic acid hydrazide and azodicarbonamide and the thermally expandable preparation has a mass ratio of sulfonic acid hydrazide to azodicarbonamide that is at least 3:1; and the at least one peroxide-crosslinkable polymer is present as one or more ethylene-vinyl acetate copolymers, in the absence of functionalized ethylene-vinyl acetate copolymers furnished with anhydride groups; the thermally curable preparations being essentially free from additional peroxide-crosslinkable polymers, apart from the one or more ethylene-vinyl acetate copolymers.

2. The thermally expandable preparation according to claim 1, wherein the one or more ethylene-vinyl acetate copolymers comprises an ethylene-vinyl acetate copolymer with a vinyl acetate content of 9 to 30 wt. %.

3. The thermally expandable preparation according to claim 1, wherein the one or more ethylene-vinyl acetate copolymers comprises an ethylene-vinyl acetate copolymer having a melt flow index of 0.3 to 400 g/10 min.

4. The thermally expandable preparation according to claim 1, wherein the low molecular weight multifunctional acrylate is selected from triethylene glycol dimethacrylate, triethylene glycol diacrylate, trimethylolpropane triacrylate (TMPTA) and trimethylolpropane trimethacrylate (TMPTMA), pentaerythritol triacrylate (TMM), tetramethylolmethane tetraacrylate (TMMT), pentaerythritol trimethacrylate, di(trimethylolpropane) tetraacrylate (TMPA) and pentaerythritol tetraacrylate.

5. The thermally expandable preparation according to claim 1, wherein the at least one peroxide is deposited onto a solid inert carrier.

6. The thermally expandable preparation according to claim 1, further comprising an activator for the azodicarbonamide.

7. A thermally expandable preparation, comprising:
   (a) at least one peroxide-crosslinkable polymer,
   (b) at least one low molecular weight multifunctional acrylate,
   (c) at least one peroxide, and
   (d) at least two chemical blowing agents,
   wherein the at least one peroxide-crosslinkable polymer comprises an ethylene-vinyl acetate copolymer with a vinyl acetate content of 9 to 30 wt. %; and the thermally expandable preparation has a mass ratio of the at least one peroxide to the at least one low molecular weight multifunctional acrylate that is greater than 0.333.

8. A thermally expandable preparation, comprising:
   (a) at least 66 wt. % of at least one peroxide-crosslinkable polymer selected from the group consisting of ethylene-vinyl acetate copolymers, ethylene-butyl acrylate copolymers, ethylene-propylene-diene copolymers, styrene-butadiene block copolymers, styrene-isoprene block copolymers, ethylene-methyl acrylate copolymers, ethylene-ethyl acrylate copolymers and ethylene-(meth)acrylic acid copolymers in the absence of functionalized copolymer furnished with anhydride groups;
   (b) at least one low molecular weight multifunctional acrylate,
   (c) at least one peroxide,
   (d) at least two chemical blowing agents comprising at least one sulfonic acid hydrazide present in an amount of 5.0 to 12.5 wt. % and an azodicarbonamide present in an amount of 0.5 to 3.5 wt. %, and
   (e) 5 to 10 wt. % of at least one filler,
   wherein the thermally expandable preparation has a mass ratio of the at least one peroxide to the at least one low molecular weight multifunctional acrylate that is at least 1.3.

* * * * *

UNITED STATES PATENT AND TRADEMARK OFFICE
CERTIFICATE OF CORRECTION

PATENT NO. : 10,301,463 B2
APPLICATION NO. : 14/160817
DATED : May 28, 2019
INVENTOR(S) : Rainer Kohlstrung, Manfred Rein and Karl Wesch It is certified that error appears in the above-identified patent and that said Letters Patent is hereby corrected as shown below:

In the Specification

Column 3, Line 31: Change "quire particularly" to --quite particularly--.

In the Claims

Column 14, Line 46: Change "1.3" to --1:3--.

Signed and Sealed this
Twenty-ninth Day of October, 2019

Andrei Iancu
*Director of the United States Patent and Trademark Office*